United States Patent [19]

Gennaux

[11] 4,406,340
[45] Sep. 27, 1983

[54] MOTOR REDUCER WITH BRAKING MEANS

[75] Inventor: Jean Gennaux, Acoz, Belgium

[73] Assignee: Ateliers de Constructions Electriques de Charleroi (ACEC), Brussels, Belgium

[21] Appl. No.: 274,652

[22] Filed: Jun. 17, 1981

[30] Foreign Application Priority Data

Jun. 17, 1980 [EP] European Pat. Off. ........ 80200569.4

[51] Int. Cl.³ ............................................. B60K 17/14
[52] U.S. Cl. .................................... 180/65 F; 74/797; 74/801; 180/60; 188/18 A
[58] Field of Search ................. 74/391, 766, 801, 764, 74/797, 758, 781 R; 180/60, 70, 65.5; 188/18 A, 71.1; 310/77, 83

[56] References Cited

U.S. PATENT DOCUMENTS 3,161,249 12/1964 Bouladon et al. ..................... 180/60
4,330,045 5/1982 Myers ............................... 188/18 A Primary Examiner—John A. Pekar
Assistant Examiner—Pierre Huggins
Attorney, Agent, or Firm—Schwartz, Jeffery, Schwaab, Mack, Blumenthal & Koch

[57] ABSTRACT

The mechanical unit, equipped with an electric motor rotating at a high velocity, turns a wheel hub at a low velocity by means of a speed reducer and includes an external brake disk rotating at an intermediate velocity. The brake disk cooperates with conventional elements to constitute a unified external braking means which operates effectively and is easily accessible.

12 Claims, 1 Drawing Figure

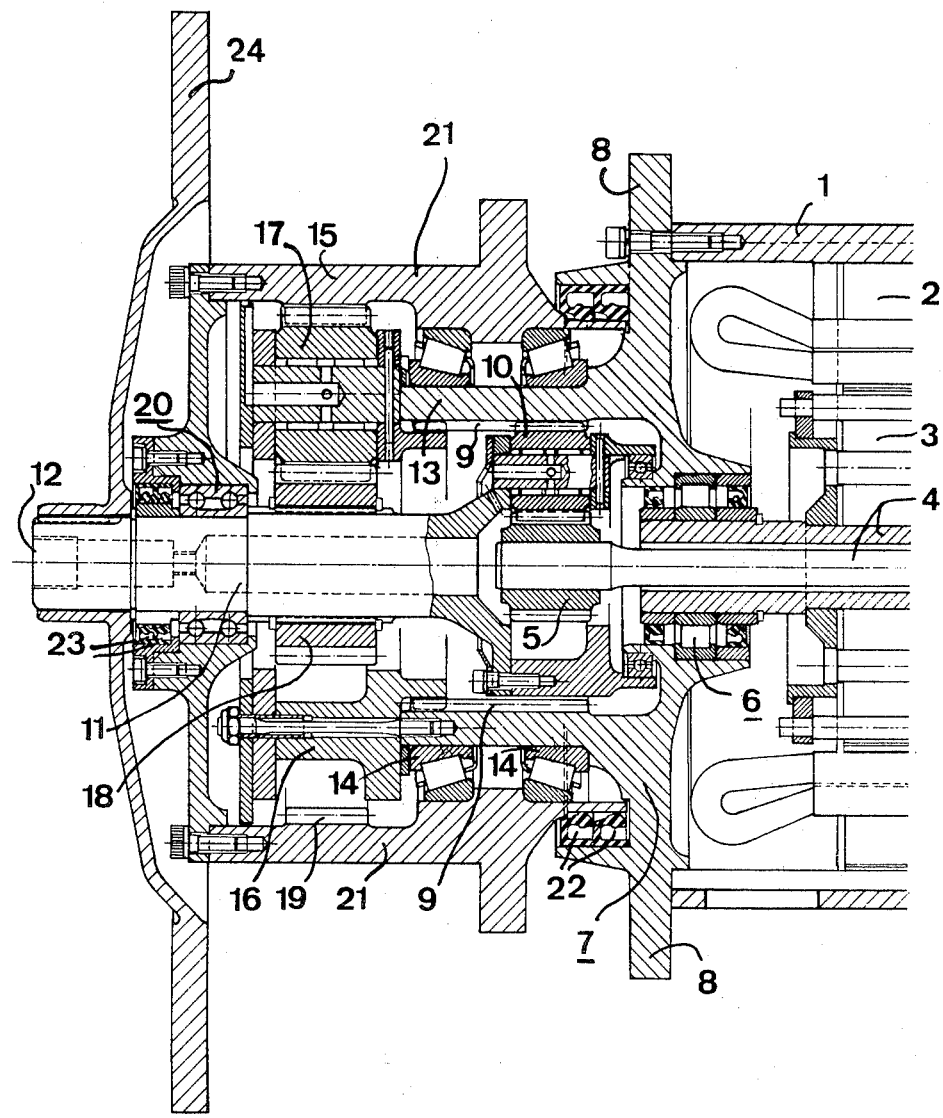

MOTOR REDUCER WITH BRAKING MEANS

BACKGROUND OF THE INVENTION

1. Field of the Invention

This invention relates to motor speed reducers incorporating brakes and especially to such speed reducers in which the brakes are adapted to dissipate kinetic energy of the vehicle adiabatically.

2. Discussion of Related Art

Numerous motor reducers with braking means exist. Some are equipped with brakes acting on the mechanical elements of the reducer rotating at a low velocity, while others have brakes acting directly on the electric motor or on the mechanical elements rotating at a high velocity. However, in order to absorb the kinetic energy acquired by a vehicle in motion in an adiabatic manner, it is necessary for the braking means to consist of a certain mass. If this mass is distributed over one or more mechanical elements rotating at a high velocity, the manufacture and use of such mechanical elements poses certain important problems of equilibrium. Furthermore, the braking of elements rotating at high velocities generates thermal phenomena that are difficult to control. Conversely, if braking is effected on elements rotating at a low velocity, it is necessary, in order to apply sufficient braking power, to develop a very high braking force couple. In this case, the dimensions and the weight of the pieces constituting these mechanisms are large and thus generate space and weight problems which are incompatible with advanced vehicle concepts. In a general manner, all brakes are located within the mechanical unit constituting the motor-reducer-brake assembly and during braking they generate heat, which strongly heats the oil bath, thereby shortening the life of the lubricant.

SUMMARY OF THE INVENTION

The present invention remedies these disadvantages by effecting braking on mechanical elements placed outside the housing of the motor-reducer-brake assembly and rotating at an intermediate speed. In this fashion, the brake elements, located outside, are well cooled and readily accessible for control, inspection and repair. The rotating parts of the braking means have sufficient mass to absorb the kinetic energy of the vehicle adiabatically and pose no balancing problems, as they are rotating at a moderate velocity. The stationary parts of the braking means are able to develop high braking power by applying a moderate force couple and they are of reduced weight and volume.

BRIEF DESCRIPTION OF THE DRAWINGS

The invention will become more apparent with the aid of the single figure representing a cross-section through the motor-reducer-brake.

DETAILED DESCRIPTION OF THE PREFERRED EMBODIMENT

A frame 1 supports a stator 2 of an electric motor, having a rotor 3 rotating at a high velocity. The rotor 3 is equipped with an elastic shaft 4 carrying at one end a pinion 5 meshing with a first gear train of the reducer. The elastic shaft 4 rests on two bearings, of which a single bearing 6 is shown in the FIGURE. The bearing 6 is part of a intermediate mechanical element 7, which also performs other functions. In effect, the mechanical element 7 is equipped with a collar, serving as the locking flange 8 for the entire mechanical unit. Furthermore, the center body of the intermediate mechanical element 7 possesses a symmetry of revolution and is provided inside with a toothed ring 9 upon which the satellite pinions 10 of a shaft 11 rotate at a moderate velocity. Shaft 11 has an external ferrule 12. The center body of the intermediate mechanical element 7 also performs the function of a journal 13 by receiving the wheel hub 15. Finally, the intermediate mechanical element 7 serves as the support for the satellite holder 16 of the second gear train of the reducer. On the satellite holder 16, the satellites 17 are mounted; they mesh on the one hand with a pinion 18 that is integral with the shaft 11 rotating at a moderate speed, and on the other, with an inner ring 19 that belongs to the wheel hub 15. The wheel hub 15 also performs a number of functions. In addition to the abovementioned function of serving as the inner toothed ring 19 of the second gear train of the reducer, it supports a bearing 20 of the shaft 11 rotating at a moderate velocity and serves as the housing 21 of the reducer assembly, insuring the tightness of the assembly by means of the double gaskets 22 and 23.

This mechanical unit thus has a ferrule 12 rotating at a moderate velocity and carrying, in a preferred embodiment, a brake disc 24, secured thereto by appropriate means. The brake disk 24 rotates at a moderate velocity and has sufficient mass to be able to effect substantial adiabatic braking without generating balancing problems. Furthermore, the stationary parts of the braking system, not shown, collaborate with the brake disk 24 in developing high braking power by the application of a moderate braking force couple. The said stationary parts of the braking system thus may consist of mechanical elements of reduced weight and volume. On the other hand, the outside location of all of the elements of the brake insures excellent cooling of all of the active parts, simplifies the entire cooling system of the brake and provides the great advantage of ready accessability for inspection and repair.

I claim:

1. An apparatus, comprising:
   an intermediate structural mechanical element;
   a wheel hub rotatably mounted to and coaxially of said element;
   an electric motor mounted coaxially of said element, said motor including a rotary output shaft;
   a speed reduction mechanism mounted in and coaxially of said element, said speed reduction mechanism comprising
      a shaft rotatably mounted within and coaxially of said element and having an end extending out of said element;
      a first reduction gear means connected coaxially between said motor output shaft and said speed reduction mechanism shaft for rotating said mechanism shaft in response to rotation of said motor shaft at a speed of rotation less than the speed of rotation of said motor shaft; and
      a second reduction gear means connected coaxially between said mechanism shaft and said hub for rotating said hub in response to rotation of said mechanism shaft at a speed of rotation lower than the speed of rotation of said mechanism shaft; and
   a brake disk mounted on and coaxially of said end extending out of said element, said mechanism shaft rotating at a speed of rotation less than the speed of rotation of said motor shaft.

2. An apparatus as set forth in claim 1, wherein said mechanical element mounts coaxially a bearing for said motor output shaft.

3. The apparatus as set forth in claim 5, wherein said mechanical element has formed thereon a toothed ring, said toothed ring bearing a portion of said first reduction gear means.

4. The apparatus as set forth in claim 3, wherein said second reduction gear means includes a satellite gear holder, said satellite gear holder being supported on said mechanical element.

5. The apparatus as set forth in claim 4, wherein said mechanical element is unitary in construction and includes a locking flange.

6. The apparatus as set forth in claim 1, wherein said wheel hub serves as a housing for at least said second reduction gear means, and also wherein said second reduction gear means includes a toothed ring formed on an inner surface of said hub.

7. The apparatus as set forth in claim 6, wherein said hub mounts a bearing for said apparatus shaft.

8. An apparatus, comprising:
  an intermediate structural mechanical element;
  a wheel hub rotatably mounted to and coaxially of said element;
  an electric motor mounted coaxially of said element, said motor including a rotary output shaft;
  a speed reduction mechanism mounted in and coaxially of said element, said speed reduction mechanism comprising
    a shaft rotatably mounted within and coaxially of said element and having an end extending out of said element;
    a first reduction gear means connected coaxially between said motor output shaft and said speed reduction mechanism shaft for rotating said mechanism shaft in response to rotation of said motor shaft at a speed of rotation less than the speed of rotation of said motor shaft; and
    a second reduction gear means connected coaxially between said mechanism shaft and said hub for rotating said hub in response to rotation of said mechanism shaft at a speed of rotation lower than the speed of rotation of said mechanism shaft; and
  a brake disk mounted on and coaxially of said end extending out of said element;
  said wheel hub serving as a housing for at least said second reduction gear means and mounting a bearing for said mechanism shaft, said second reduction gear means including a toothed ring formed on an inner surface of said hub.

9. The apparatus as recited in claim 8, wherein said mechanical element mounts coaxially a bearing for said motor output shaft.

10. The apparatus as recited in claim 9, wherein said mechanical element has formed thereon a toothed ring, said toothed ring being a portion of said first reduction gear means.

11. The apparatus as recited in claim 10, wherein said second reduction gear means includes a satellite gear holder, said satellite gear holder being supported on said mechanical element.

12. The apparatus as recited in claim 11, wherein said mechanical element is unitary in construction and includes a locking flange.

* * * * *